US008126195B2

(12) United States Patent  (10) Patent No.: US 8,126,195 B2
Landers, Jr. et al.  (45) Date of Patent: Feb. 28, 2012

(54) GRAPHICAL RETAIL ITEM IDENTIFICATION WITH POINT-OF-SALE TERMINALS

(75) Inventors: John D. Landers, Jr., Raleigh, NC (US); David J. Steiner, Raleigh, NC (US); Paul M. Wilson, Cary, NC (US); Kimberly A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 12/165,685

(22) Filed: Jul. 1, 2008

(65) Prior Publication Data
US 2010/0002902 A1  Jan. 7, 2010

(51) Int. Cl.
  *G06K 9/00*  (2006.01)
(52) U.S. Cl. ............. 382/100; 382/304; 705/21; 705/23
(58) Field of Classification Search .................. 382/100, 382/110, 302, 304, 307; 705/16, 21, 23; 348/150; 718/100, 101; 709/201
See application file for complete search history.

(56) References Cited

U.S. PATENT DOCUMENTS

| 6,159,150 | A | 12/2000 | Yale et al. ..................... 600/437 |
| 7,168,618 | B2 * | 1/2007 | Schwartz ...................... 235/383 |
| 7,422,147 | B2 * | 9/2008 | Rosenbaum ................... 235/383 |
| 2005/0189412 | A1 | 9/2005 | Hudnut et al. ................ 235/383 |
| 2006/0279777 | A1 | 12/2006 | Matsumoto ................. 358/1.15 |
| 2007/0263820 | A1 | 11/2007 | Czysczewski et al. .. 379/201.12 |

OTHER PUBLICATIONS

Landers, et al.; Visual Item Scanning/Identification Using Grid Computing, 2pp.
Arndt, et al.; Backup Terminal Provides Extra Capability During Normal Operation of Multi Terminal Transaction Processing System; TDB 11-80 p2464-2465; Nov. 1980; pp. 2464-2465; Rochester.

* cited by examiner

*Primary Examiner* — Andrew W Johns
(74) *Attorney, Agent, or Firm* — Edward J. Lenart; Thomas E. Tyson; Biggers & Ohanian, LLP.

(57) ABSTRACT

Graphical retail item identification including receiving, from a digital camera, an image of a retail item to be identified; decoding, by an image decoding module, the image into one or more image processing tasks; assigning, by a task assignment engine, the one or more image processing tasks to one or more of the POS terminals, the one or more POS terminals characterized as image processing terminals; executing the image processing tasks by the image processing terminals, including reporting results of the image processing tasks to an item identification engine; and identifying, by the item identification engine upon completion of the image processing tasks by the image processing terminals, the retail item.

18 Claims, 5 Drawing Sheets

GRAPHICAL RETAIL ITEM IDENTIFICATION WITH POINT-OF-SALE TERMINALS

BACKGROUND OF THE INVENTION

1. Field of the Invention

The field of the invention is data processing, or, more specifically, methods, apparatus, and products for graphical retail item identification.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems of various implementations today are relied on greatly by many industries. One such industry that relies on computer systems is the retail industry. In typical, high item count retail establishments, items that are to be purchased have barcodes printed on the packaging where a scanner in a checkout lane decodes the label into a number. These scanners are self contained units that are designed to only decode barcodes meeting a defined set of standards. The speed at which the scanners can actually recognize a barcode varies greatly. Some scanners use reflections of moving laser beams off a barcode to recognize and decode the barcode, while others capture a picture of the barcode, and image processing software within the scanner processes the barcode to find a matching valid barcode pattern.

In most scanning situations, the barcode must be positioned in a certain orientation for the scanner to accurately detect and decode the barcode. What would be far more desirable would a system that would recognize the item based on the item's appearance and not on a barcode. Image identification of this type, however, is expensive to implement due to the amount of processing power required for such object recognition to occur in a timely manner. A typical grocery store, for example, contains approximately 30,000 individual items, and recognizing one item from the 30,000 requires a vast amount of computing power. Moreover, in order for item recognition to be used efficiently, items must be recognized in 100-200 milliseconds or less.

There are numerous algorithms for image recognition. Many of these algorithms lend themselves well to parallel processing techniques where various parameters of a single image are processed by many processors simultaneously to carry out a complete image processing method. This can be far faster than a single processor performing these steps sequentially.

Consider as an example, a high volume grocery store or mass merchandise store. These stores have approximately 30-80 networked POS terminals within the store. Each of these POS terminals may include very high performance processors, some with dual core processors for example. Many of these 30-80 POS terminals area also typically idle or under a very low processor load. In addition, even when a terminal is under some load, the load is typically very low compared to the processor's maximum capability. This is so, because POS terminals, by their nature, are typically I/O bound, that is, waiting for the operator, waiting for a hard drive, waiting for the server, and so on. The processor of a POS terminal typically does very few, if any, resource intensive tasks. In addition, most networked POS terminals are interconnected with in a high speed local area network, such as an Ethernet or Fibre Channel network, capable of moving large amounts of data between the terminals very quickly. Readers of skill in the art will recognize that what is needed is a graphical method of retail item identification that is carried out by such networked POS terminals where the available computer processing resources of the POS terminals may be harnessed for image processing.

SUMMARY OF THE INVENTION

Methods, apparatus, and products for graphical retail item identification where the identification is carried out with at least one digital camera and a plurality of point-of-sale ('POS') terminals, the POS terminals connected for data communications through a data communications network. Each of the POS terminals may be implemented as automated computing machinery having disposed within it instances of an image decoding module, a task assignment engine, and an item identification engine. Such graphical retail item identification according to embodiments of the present invention includes receiving, from the digital camera, an image of a retail item to be identified; decoding, by an image decoding module, the image into one or more image processing tasks; assigning, by a task assignment engine, the one or more image processing tasks to one or more of the POS terminals, the one or more POS terminals characterized as image processing terminals; executing the image processing tasks by the image processing terminals, including reporting results of the image processing tasks to an item identification engine; and identifying, by the item identification engine upon completion of the image processing tasks by the image processing terminals, the retail item.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
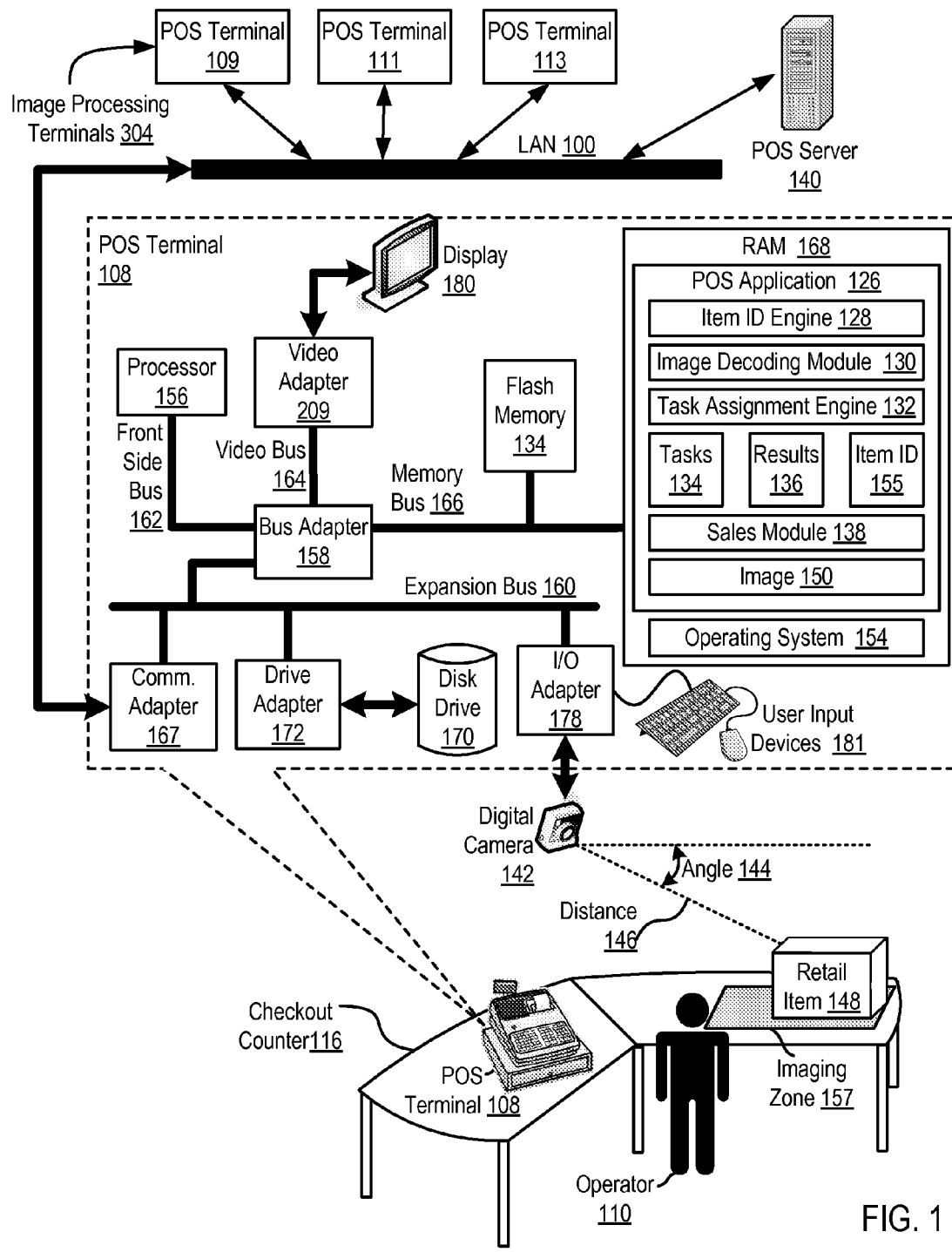
FIG. 1 sets forth a functional block diagram of an exemplary system for graphical retail item identification according to embodiments of the present invention.

Exemplary methods, apparatus, and products for graphical retail item identification in accordance with the present invention are described with reference to the accompanying drawings, beginning with FIG. 1. FIG. 1 sets forth a functional block diagram of an exemplary system for graphical retail item identification according to embodiments of the present invention. Retail item identification according to embodiments of the present invention is described as 'graphical' because the identification is carried out through processing a digital image of the retail item, not by barcode scanning or Radio Frequency Identification ('RFID') techniques. Digital image processing refers to the use of computer algorithms to perform image processing on digital images, such as object recognition and identification. Digital image processing used to identify a particular object in a digital image may be carried out using a variety of algorithms. Some object identification algorithms determine regions of an object and analyze those regions for particular characteristics, sometimes called 'features.' Other object identification algorithms analyze an entire object for such features. The features of the object to be identified may be compared to a specification of features, sometimes referred to as 'learned models,' for a group of known objects in order to find an object having equivalent or nearly equivalent features.

Graphical retail item identification according to embodiments of the present invention is carried out by a number of POS terminals and at least one digital camera. That is, according to embodiments of the present invention, multiple POS terminals operate together to identify a particular retail item through use of one or more images of the particular retail item captured by a digital camera. The system of FIG. 1 includes a number of such point-of-sale ('POS') terminals (108, 109, 111, 113) and a digital camera (142). A POS terminal is automated computing machinery used to complete retail transactions at a checkout counter (116) and useful for graphical retail item identification according to embodiments of the present invention. An operator (110) may operate the POS terminal through user input devices (181), such as a keyboard, mouse, touch-screen, and the like, to complete such transactions. The POS terminals (108, 109, 111, and 113) in the example of FIG. 1 are connected for data communications through a local area network ('LAN') (100).

Connected to the POS terminal (108) in the example of FIG. 1 is a digital camera (142). Such a digital camera (142) is configured to capture one or more images of a retail item to be identified when such a retail item (148) enters an imaging zone (157), an area of the checkout counter in which images of retail items are captured. An imaging zone may be an area, for example, along a conveyer belt that leads retail items toward the POS terminal (108) and the operator (110). A user, such as a customer or an operator, may indicate entrance of a retail item to be identified in an imaging zone through use of a user input device, such as keyboard, or button designated for such a purpose. Alternatively, entrance of a retail item (148) in an imaging zone (157) may be automatically detected without human intervention by a digital scale that identifies a change of on a conveyer belt, by disruption of an infrared ('IR') transmission across the item imaging zone, a change in an electromagnetic field in the imaging zone, and in other ways as will occur to readers of skill in the art. Readers of skill in the art will also recognize that although only one digital camera is directly connected to the POS terminal (108), any number of digital cameras as will occur to readers of skill in the art may be connected, either directly through an I/O adapter (178) or indirectly, through a data communications network for example.

The POS terminal (108) is one example of automated computing machinery useful for graphical retail item identification according to embodiments of the present invention. The terminal (108) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a POS Application (126), a set of computer program instructions that causes the automated computing machinery of the POS terminal (108) to operate for graphical retail item identification according to embodiments of the present invention. The POS application (126) of FIG. 1 includes several software components such as an item identification engine (128), an image decoding module (130) a task assignment engine (132) and a sales module (138). Readers of skill in the art will recognize that each of the other POS terminals (109, 111, 113) in the example of FIG. 1 may also execute an instance of an item identification engine (128), an image decoding module (130) a task assignment engine (132) and a sales module (138).

The POS application (126) of the POS terminal (108) of FIG. 1 includes computer program instructions capable of receiving, from the digital camera (142), an image (150) of a retail item (148) to be identified and decoding, by the image decoding module (130), the image (150) into one or more image processing tasks (134).

An image processing task specifies one or more graphic image characteristics of an object in the digital image to be identified by a POS terminal through digital image processing. A graphic image characteristic of an object in a digital image is a value of a parameter of a feature of the object. Examples of graphic image characteristics include, the length of a particular edge of the object, the dominant color of a particular region of an object, and so on as will occur to readers of skill in the art.

Some image processing tasks decoded from the same image may be executed in parallel while others may be executed synchronously. An image processing task may specify, for example, an algorithm for identifying edges of an object, an algorithm for determining a shape of the object, an algorithm for determining the length of a particular edge of an object, an algorithm for identifying a dominant color of a region of an object, and so on as will occur to those of skill in the art. Some of these example image processing tasks may be carried out in asynchronously or in parallel while others may be carried out synchronously. An edge identification algorithm may be carried out synchronously with and before a length determination algorithm because such a length determination algorithm may use as an input the edges identified by the edge identification algorithm. Such identified edges, however, may also be used as an input to several different length determination algorithms that are carried out in parallel where each of the algorithms identifies a length of a different edge.

The POS application (126) of the POS terminal (108) of FIG. 1 also includes computer program instructions capable of assigning (310), by the task assignment engine (132), the one or more image processing tasks (134) to one or more of the POS terminals. POS terminals that are assigned an image processing task are characterized as image processing terminals (304) in this specification for ease of explanation. Examples of image processing terminals (304) in FIG. 1 include POS terminal (109), POS terminal (111), and POS terminal (113). That is, in the example of FIG. 1, the POS terminal (108) assigns at least one image processing task to the POS terminal (109), the POS terminal (111), and the POS terminal (113).

Assigning (310), by the task assignment engine (132), the one or more image processing tasks (134) to one or more of the POS terminals may also include sending to each of the image processing terminals (304) the image (150) of the retail item to be identified (148), a distance (146) from which the image was captured by the digital camera (142), an angle (144) at which the image was captured by the digital camera, and an instruction to identify at least one graphic image characteristics of the retail item. The distance (146) from which the image was captured and the angle (144) at which the image (150) was captured may be used by an image processing terminal to identify a particular graphic image characteristic by determining orientation of an object in the image, scale of the object, and so on as will occur to those of skill in the art.

The image processing terminals (304) in the example of FIG. 1 are capable of executing the assigned image processing tasks (134) and reporting results (136) of the image processing tasks (134) to an item identification engine (128). In this example, the image processing terminals (304) report the results (136) of the image processing tasks (134) to the item identification engine (128) of the POS terminal (108). Results of the image processing tasks include graphic image characteristics by the POS terminal when executing the image processing task.

The POS application (126) of the POS terminal (108) of FIG. 1 also includes computer program instructions capable of identifying, by the item identification engine (128) upon completion of the image processing tasks (134) by the image processing terminals (304), the retail item (148). The POS application (126) may identify the retail item (148) through use of an item recognition database that associates graphic image characteristics of retail items and identifiers of retail items by finding a record in the database that includes the graphic image characteristics of the retail item. Such an item recognition database may include, for example, a table each record of which represents a retail item amenable to graphic identification according to embodiments of the present invention. In the example of FIG. 1, the POS server (140) may provide such an item recognition database.

Upon finding a record in the database the item identification engine may include retrieving an item identification (155) and passing the item identification to the sales module (138), a module of computer program instructions that administers and processes a sales transaction. Such a sales module may use the item identification to query a database for a price of the item.

Also stored in RAM (168) is an operating system (154). Operating systems useful for graphical retail item identification according to embodiments of the present invention include UNIX™, Linux™, Microsoft XP™, Microsoft Vista™, AIX™, IBM's i5/OS™, and others as will occur to those of skill in the art. The operating system (154), POS application and its components (128, 130, 132, 138), in the example of FIG. 1, are shown in RAM (168), but many components of such software typically are stored in non-volatile memory also, such as, for example, on a disk drive (170) or in flash memory (134).

The POS terminal (108) of FIG. 1 also includes disk drive adapter (172) coupled through expansion bus (160) and bus adapter (158) to processor (156) and other components of the POS terminal (108). Disk drive adapter (172) connects non-volatile data storage to the POS terminal (108) in the form of disk drive (170). Disk drive adapters useful in computers that administering digital media streams according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example POS terminal (108) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example POS terminal (108) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary POS terminal (108) of FIG. 1 includes a communications adapter (167) for data communications with a data communications network (100), other POS terminals (109, 111, 113), and POS servers (140). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one terminal sends data communications to another terminal or server, directly or through a data communications network. Examples of communications adapters useful in POS terminals capable of graphical retail item identification according to embodiments of the present invention include modems for wired dial-up communications, Ethernet (IEEE 802.3) adapters for wired data communications network communications, and 802.11 adapters for wireless data communications network communications.

The arrangement of servers, terminals, networks, cameras and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
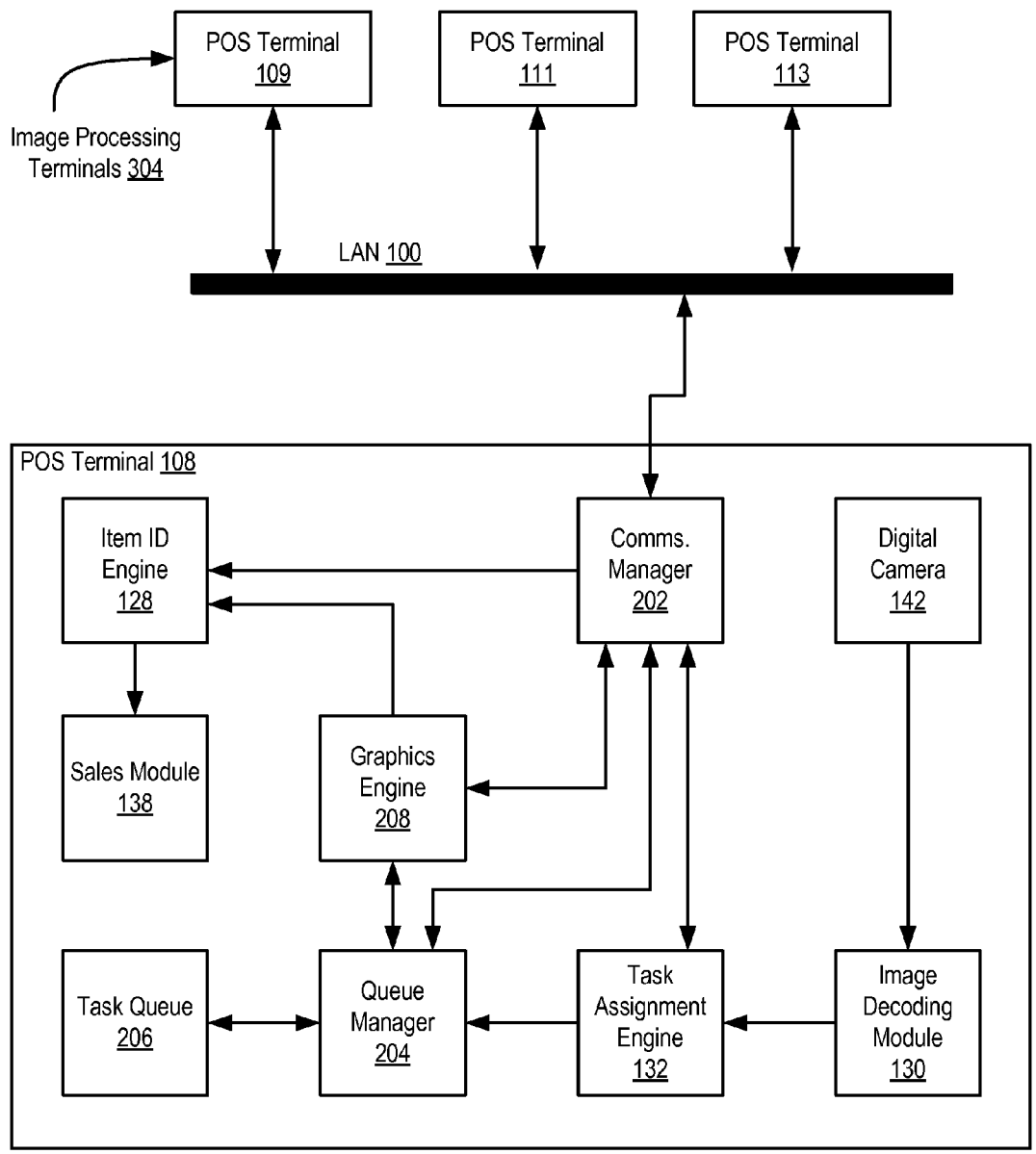
FIG. 2 sets forth a functional block diagram of a further exemplary system for graphical retail item identification according to embodiments of the present invention.

FIG. 2 sets forth a functional block diagram of a further exemplary system for graphical retail item identification according to embodiments of the present invention. The system of FIG. 2 includes four POS terminals (108, 109, 111, 113) connected for data communications through a data communications network (100). Data communications among the POS terminals (108, 109, 111, 113) may be carried out according to a point-to-point data communications protocol. In such a protocol, POS terminals may be organized in various master-slave architectures where a POS terminal that is the ultimate recipient of an identity of a particular retail item is referred to as a 'master' terminal and other terminals used in identifying the particular retail are referred to as 'slave' terminals with respect to the particular retail item. Readers of skill in the art will recognize, however, that any one of the POS terminals of FIG. 2, according to embodiments present invention, may operate simultaneously as a master and slave for different retail items to be identified. That is, POS terminal (108) may be the ultimate recipient of an identity of a first retail item, while being used in identifying a second retail item, where the POS terminal (109) is the ultimate recipient of the identity of the second retail item. In such an example, the POS terminal (108) may be referred to as a master terminal with respect to the first retail item and a slave with respect to the second retail item.

Any of the POS terminals in the example of FIG. 2 may be connected to one or more digital cameras (142) for receiving digital images of retail items to be identified. Each of the POS terminals (108, 109, 111, 113) in the example of FIG. 2 also includes an instance of an image decoding module (130), a task assignment engine (132), and an item identification engine (128). Each of the POS terminals (108, 109, 111, 113) in the example of FIG. 2 also includes a queue manager (206), a module of computer program instructions that manages a task queue (206), a graphics engine (208), an aggregation of computer hardware and software capable of executing image processing tasks, a communications manager (202), a module of computer program instructions that manages data communications among the POS terminals according to a point-to-point data communications protocol, and a sales module (138), a module of computer program instructions that administers and processes a sales transaction.

The communications manager (202) may be capable of managing data communications in the form of data communications packets from various POS terminals. In some embodiments of the present invention data communications packets transmitted according to a point-to-point data communications protocol are of different packet types and each packet may optionally include payload data. The communication manager (202) may be configured to identify a packet type, such as a result, a workpiece, a resource availability query and the like, of a packet, pass along payload data to the appropriate module, and send an acknowledgement to the sender of receipt of the data communications packet.

Consider as an example, that the POS terminal (108) in the Figure is operating as a master and the POS terminals (109, 111, 113) are operating as a slave. That is, consider that the POS terminal (108) receives, from the digital camera (142), an image of a retail item to be identified, decodes, by the image decoding module (130), the image into one or more image processing tasks, and assigns, by the task assignment engine (132), the one or more image processing tasks to one or more of the POS terminals (109. 111, 113), referred to here as image processing terminals (304) or slaves.

The task assignment engine (132) may assign the one or more image processing tasks to one or more of the POS terminals (109. 111, 113) by querying, through the communications manager (202), the image processing terminals (109, 111, 113) for availability of image processing resources and receiving from the image processing terminals a response to the query advising of the availability of such image processing resources.

Upon receiving such responses, the task assignment engine (132) may send to each of the POS terminals, through the communications manger, a workpiece that includes a particular image processing task and an image upon which to perform the image processing task. To send a workpiece to a POS terminal, the communications manager may form one or more data communications packets with the particular image processing task and image as payload data, insert in a header of the data communications packets a task identification ('ID') identifying the particular image processing task, and insert in the header a job ID indicating the particular retail item to be identified through execution of the task. In this way, a communications manager may manage data communications for various jobs, that is, fir various retail items to be identified, because results of image processing tasks for the different jobs may be received asynchronously.

In some embodiments, image processing resources of an image processing terminal may become unavailable after a response to the master POS terminal advising that such resources are in fact available but before a workpiece is received from the master POS terminal. To reduce delays in identifying a retail item in such an embodiment, the communications manager may administer determine that the image processing terminal has not returned a result in a predefined amount of time and as such queries and sends the workpiece to another POS terminal.

The communications manager (202) upon sending a workpiece may also track POS terminals to which a workpiece for a particular job have been sent whether a result from that POS terminal has been received. The communications may track such sending of workpieces by storing in a table a terminal ID of the POS terminal that was sent the workpiece, a Job ID for the workpiece, a task ID for the workpiece, and a memory location of the result, if any, of executing the task.

The task assignment engine (132), in addition to querying other POS terminals (109, 111, 113) for available resources may also query its own queue manager (204) for available resources. That is, a task assignment engine (132) of a particular POS terminal (108) according to embodiments of the present invention may assign an image processing task to itself along with other POS terminals.

Results of executing image processing tasks may be received in one or more data communication packets that include, the result as payload data, a task ID and hob ID in one or more packet headers, and a POS terminal ID of the sending POS terminal. Upon receiving such data communications packets, the communications manager (202) may store the result in computer memory, and pass the task ID, job ID, and the location in memory of the result to the item identification engine (128).

Also upon receiving a result from a POS terminal, the communications manager may be configured to determine whether all results for the job ID matching the job ID of the most recently received result have been received. That is, the communications manager, upon receiving a result, may determine if all image processing tasks assigned for a particular job ID have been received. If all image processing tasks assigned for a particular job ID have been received the communications manager (202) may notify the item identification engine (128). As mentioned above, each result of an image processing tasks may be a graphic image characteristic of the retail item.

As an alternative to the communications manager (202) tracking sent workpieces and received results, the item identification manager (128) may track such results in a task results queue managed by the item identification engine. That is, the communications manager, upon sending a workpiece may notify the item ID engine of a Job ID and a task ID. The item identification engine (128) may, in turn, configure a results queue for the job ID that tracks, for each task ID, a memory location of a received result of executing the image processing task.

The item identification engine, upon receiving results of all image processing tasks for a particular job, that is for a particular item to be identified, may identify the retail item (148) by using the graphic image characteristics of the retail item to be identified stored in memory by the communications manager to query a retail item data base to find a record in the database that includes the graphic image characteristics of the retail item. The result of the query may be an item identification which may be passed to a sales module (138) for processing a sales transaction. The sales module (138) may, for example, query a database for a price of the identified retail item, update an inventory database, or other sales related tasks that may occur to readers of skill in the art.

Consider, as another example, that POS terminal (111) is a master and that POS terminal (108) is a slave. POS terminal (111) may receive, from a digital camera (142), an image (150) of a retail item (148) to be identified, decode the image into image processing tasks, and assign at least one image processing task the POS terminal (108).

Assigning the image processing task to the POS terminal (108) may include querying the terminal (108) for available image processing resources. The query may be passed along from the communications manager (202) to the queue manager (204) which may determine whether the task queue (206) includes a number of tasks greater than a predetermined threshold or determine from the graphics engine (208) or through an operating system ('OS') application program interface ('API') whether computer processor utilization is above a predetermined threshold value. If the task queue (206) includes a number of tasks greater than a predetermined threshold the queue manager (204) advises the master terminal of unavailability of image processing resources otherwise the queue manager (204) advises the master terminal of the availability of such image processing resources. If processor utilization is above a predetermined threshold value the queue manager (204) advises the master terminal of unavailability of image processing resources otherwise the queue manager advises the master terminal of the availability of such image processing resources.

Upon receiving by the master terminal (111), a response advising of availability of image processing resources from the POS terminal (108), the master POS terminal may send a workpiece to the POS terminal (108). Such a workpiece may include a task ID, a Job ID, an image upon which to perform the image processing task and a terminal ID to which results of the image processing task are to be sent. Upon receiving such a workpiece, the communications manager (202) of the example of FIG. 2, may store the image in at a memory address, and pass along the memory address of the image and the task ID to the queue manager (204) which then inserts the task ID into the task queue (206) for later processing.

When the task is ready for execution, the POS terminal (108), may execute the image processing tasks by passing by the queue manager (204) the task ID, job ID, and memory location to the graphics engine (208) which may use the memory location and the task ID to perform digital image processing upon the image. The task ID may uniquely identify a particular algorithm which the graphics engine is configured to carry out.

After carrying out the digital image processing, the graphics engine (208) may report the results of the image processing task to an item identification engine (128) of the master POS terminal. Reporting the results of the image processing task to an item identification engine (128) of the master POS terminal may be carried out by passing to the communications manager results of the image processing tasks, a task ID, and Job ID. The communications manager then may format the results as a payload data of one or more data communications packets, insert into packet headers the task ID and job ID, and send the packets to the master POS terminal which, in turn, may identify the retail item (148) upon completion of all image processing tasks.

Consider as another example, that the POS terminal (111) receives an image of a retail item to be identified indirectly from a master terminal, POS terminal (108), that is directly connected to the digital camera and delegates responsibility for decoding the image, assigning the image processing tasks, and identifying the retail item upon completion of the image processing tasks to the POS terminal (111). The image decoding module (130) of the POS terminal (108) may be configured to notify the task assignment engine (132) upon receipt of a digital image prior to decoding the image. The task assignment engine may then delegate responsibility for decoding the image, assigning the image processing tasks, and identifying the retail item upon completion of the image processing tasks to the POS terminal (111) by sending, in one or more data communications packets, the image, an instruction to the POS terminal (111) to carry out the steps of decoding, assigning, and identifying, and a POS terminal ID identifying the POS terminal (108) as the terminal to which the POS terminal (111) is to report the identity of the retail item.

Upon receiving such data communications packets, the POS terminal (111) may decode the image into one or more image processing tasks and assign the tasks to POS terminals (109, 111). Workpieces assigned by POS terminal (111) may include a job ID, and a terminal ID identifying the POS terminal (111) as the terminal to which POS terminals (109, 111) are to send results of the tasks. The POS terminals (109, 113) may execute the tasks and send the results of the tasks to the POS terminal (111) which may then identify the retail item. The POS terminal (111) may then report the identity of the retail item to the POS terminal (108).

Consider as yet another example, that POS terminal (108) is a master terminal and POS terminals (109, 113) are image processing terminals or slave terminals. After decoding the image into image processing tasks, the POS terminal (108) may delegate, to the POS terminal (111), responsibility for identifying the retail item upon completion of the image processing tasks. The task assignment engine may delegate, to the POS terminal (111), responsibility for identifying the retail item upon completion of the image processing tasks by sending in a data communications packet an notification of the delegation, a job ID, a number of tasks, and a terminal ID identifying the POS terminal (108) as the terminal to which the POS terminal (111) is to send the identity of the retail item.

Assigning image processing tasks to the image processing terminals in such an example may include advising the image processing terminals to send the results of the image processing tasks to the POS terminal (111). That is, the workpieces sent from the task assignment engine (132) of the POS terminal (108) to the POS terminals (109, 113) may include a job ID, a task ID, and a terminal ID identifying the POS terminal (111) as the terminal to send results of the image processing tasks.

The POS terminal (111) may receive the results of the image processing tasks from the image processing terminals in one or more data communications packets. The data communications packets may include the result of the task, the job ID, and the task ID. The POS terminal (111) may tracking the completion of assigned tasks as explained above and upon completion of all tasks, may use the results to find an identity, an item ID, of the retail item. The POS terminal (111) may send the item ID to the POS terminal (108) in a data communications packet that includes the job ID.

Readers of skill in the art will recognize that although only four example master-slave architectures are described here for clarity, many possible architectures may exists, and each such architecture is well within the scope of the present invention. Moreover, the point-to-point communications protocol described above is just one of many different example protocols that may be implemented for data communications among the POS terminals. In fact, packets of data transmitted among the POS terminals for graphical retail item identification according to embodiments of the present invention may include more or less information than that described above.

Figure 3:
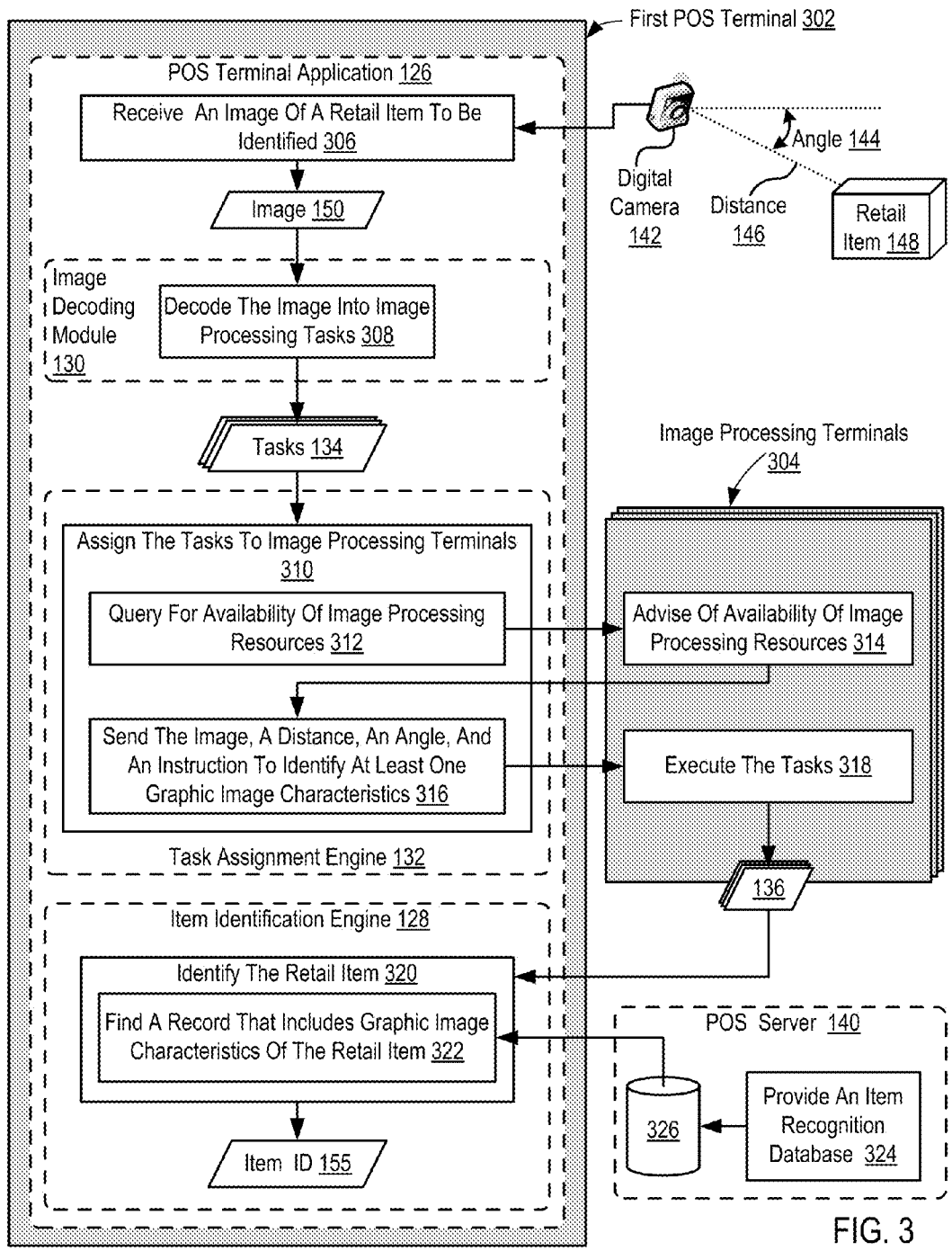
FIG. 3 sets forth a flow chart illustrating an exemplary method for graphical retail item identification according to embodiments of the present invention.

For further explanation, FIG. 3 sets forth a flow chart illustrating an exemplary method for graphical retail item identification according to embodiments of the present invention. The method of FIG. 3 may be implemented with at least one digital camera (142) and a plurality of point-of-sale ('POS') terminals (302, 304).

The POS terminals (302, 304) in the example of FIG. 3 are connected for data communications through a data communications network. Each of the POS terminals in the example of FIG. 3 includes, as software components of a POS terminal application (126), an image decoding module (130), a task assignment engine (132), and an item identification engine (128).

The method of FIG. 3 includes receiving (306), from the digital camera (142) by the first POS terminal (302), an image (150) of a retail item (148) to be identified. The digital camera may be directly connected to the first POS terminal or indirectly connected through another POS terminal or through a data communications network. In some embodiments a POS terminal is directly connected to two or three digital cameras which each capture an image of a retail item to be identified while the retail item travels along a conveyer belt toward an operator of the POS terminal.

The method of FIG. 3 also includes decoding (308), by an image decoding module (130) the image (150) into one or more image processing tasks (134). The decoding image decoding module may decode an image into one or more tasks in various ways including for example, by decoding every image into the same number and type of tasks, by partitioning the image into multiple portions and assigning a task to each portion, and in other ways as will occur to those of skill in the art.

Assigning (310), by a task assignment engine (132), the one or more image processing tasks (134) to one or more of the POS terminals, the one or more POS terminals characterized in the example of FIG. 3 as image processing terminals (304). Assigning (310), by a task assignment engine (132), the one or more image processing tasks (134) to one or more of the POS terminals may include querying (312) the image processing terminals (304) for availability of image processing resources. If image processing resources of the image processing terminals are available, the method of FIG. 3 continues by advising the task assignment engine (310) of the first POS terminal (302), by the image processing terminals (304), of the availability of image processing resources.

Upon receiving such a response advising of availability of image processing resources, assigning (310) the image processing tasks (134) to the image processing terminals (304) continues by sending (316) to each of the image processing terminals (304) the image (150) of the retail item (148) to be identified, a distance (146) from which the image was captured by the digital camera (142), an angle (144) at which the image was captured by the digital camera, and an instruction to identify at least one graphic image characteristics of the retail item.

The method of FIG. 3 also includes executing (318) the image processing tasks (134) by the image processing terminals (304). Executing (318) the image processing tasks may include reporting results (136) of the image processing tasks (134) to an item identification engine (128) of the first POS terminal (302). In the example of FIG. 3, the results (136) of the image processing tasks (134) are graphic image characteristics of the retail item, such as, a number of edges, lengths of each edge, dominant colors of various regions of the item, and so on.

The method of FIG. 3 also includes identifying (320), by the item identification engine (128) upon completion of the image processing tasks (134) by the image processing terminals (304), the retail item (148). Identifying (320) the retail item (148) may be carried out by finding (322) a record in an item recognition database (326) that includes the graphic image characteristics of the retail item. In the method of FIG. 3, POS server (140) provides (324) such an item recognition database (326) to the POS terminals. The item recognition database (326) associates graphic image characteristics of retail items and identifiers of retail items.

Figure 4:
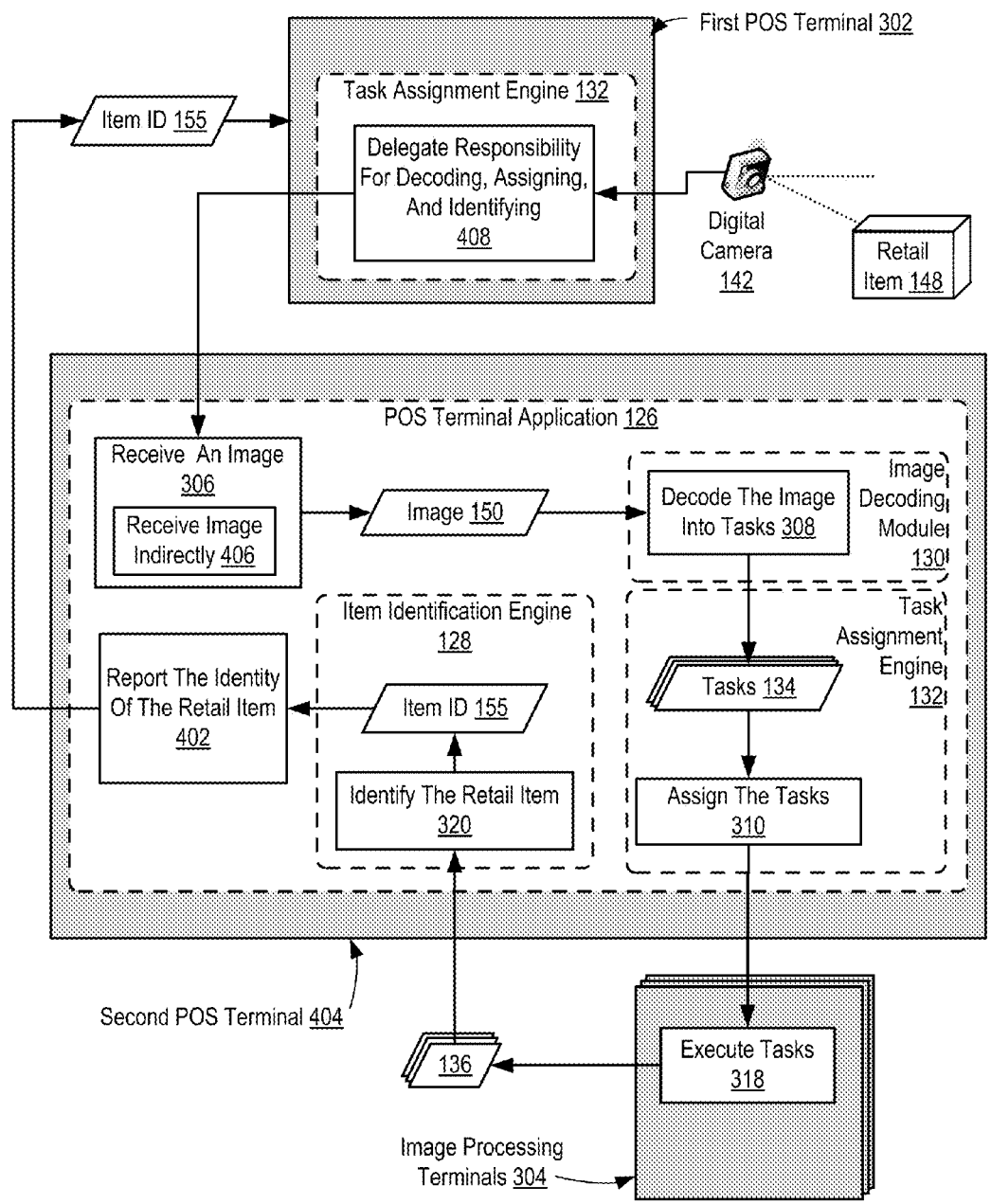
FIG. 4 sets forth a flow chart illustrating a further exemplary method for graphical retail item identification according to embodiments of the present invention.

For further explanation, FIG. 4 sets forth a flow chart illustrating a further exemplary method for graphical retail item identification according to embodiments of the present invention. The method of FIG. 4 is similar to the method of FIG. 3 in that the method of FIG. 4 is also implemented with at least one digital camera (142) and a plurality of point-of-sale ('POS') terminals (302, 304, 404) which are connected for data communications through a data communications network. Each of the POS terminals in the example of FIG. 4 also includes, as software components of a POS terminal application (126), an image decoding module (130), a task assignment engine (132), and an item identification engine (128).

The method of FIG. 4 is also similar to the method of FIG. 3 in that the method of FIG. 4 includes receiving (306), from the digital camera (142), an image (150) of a retail item (148) to be identified; decoding (308), by an image decoding module (130), the image (150) into one or more image processing tasks (134); assigning (310), by a task assignment engine (132), the one or more image processing tasks (134) to one or more of the POS terminals, the one or more POS terminals characterized as image processing terminals (304); executing (318) the image processing tasks (134) by the image processing terminals (304), including reporting results (136) of the image processing tasks (134) to an item identification engine (128); and identifying (320), by the item identification engine (128) upon completion of the image processing tasks (134) by the image processing terminals (304), the retail item (148).

The method of FIG. 4 differs from the method of FIG. 3, however, in that in the method of FIG. 4, decoding the image, assigning the image processing tasks, and identifying the retail item upon completion of the image processing tasks is not carried out by the first POS terminal (302), but is instead carried out by a second POS terminal (404). That is, in the method of FIG. 4 the task assignment engine (132) of the first POS terminal (302) delegates (408), to the second POS terminal (404), responsibility for decoding the image, assigning the image processing tasks, and identifying the retail item upon completion of the image processing tasks. Delegating (408), such responsibilities may also include sending, in one or more data communications packets, an image (150) of the retail item (148) to be identified along with an instruction to carry out the decoding, assigning, and identification steps.

In the method of FIG. 4, receiving (306) the image (150) is carried out by receiving (406) the image by the second POS terminal (404) indirectly from the camera (142) through the first POS terminal (302). In the method of FIG. 4, the camera is attached directly to the first POS terminal. The second POS terminal may receiving receive (406) the image indirectly from the camera (142) through the first POS terminal (302), as explained above, in one or more data communications packets that include the image (150) along with an instruction to carry out the decoding, assigning, and identification steps.

After receiving, by the second POS terminal, the delegation of responsibility to carry out the decoding, assignment, and identification steps, and after receiving the image (150) of the item (148) to be identified, the method of FIG. 4 continues by decoding (308) the image, assigning (310) the image processing tasks to image processing terminals, executing (318) the tasks by the image processing terminals, and identifying (320) the retail item upon completion of the image processing tasks. After identifying the retail item (320) by the item identification engine (128), the method of FIG. 4 continues by includes reporting (402), by the second POS (404) terminal to the first POS terminal (302), the identity (155) of the retail item.

Figure 5:
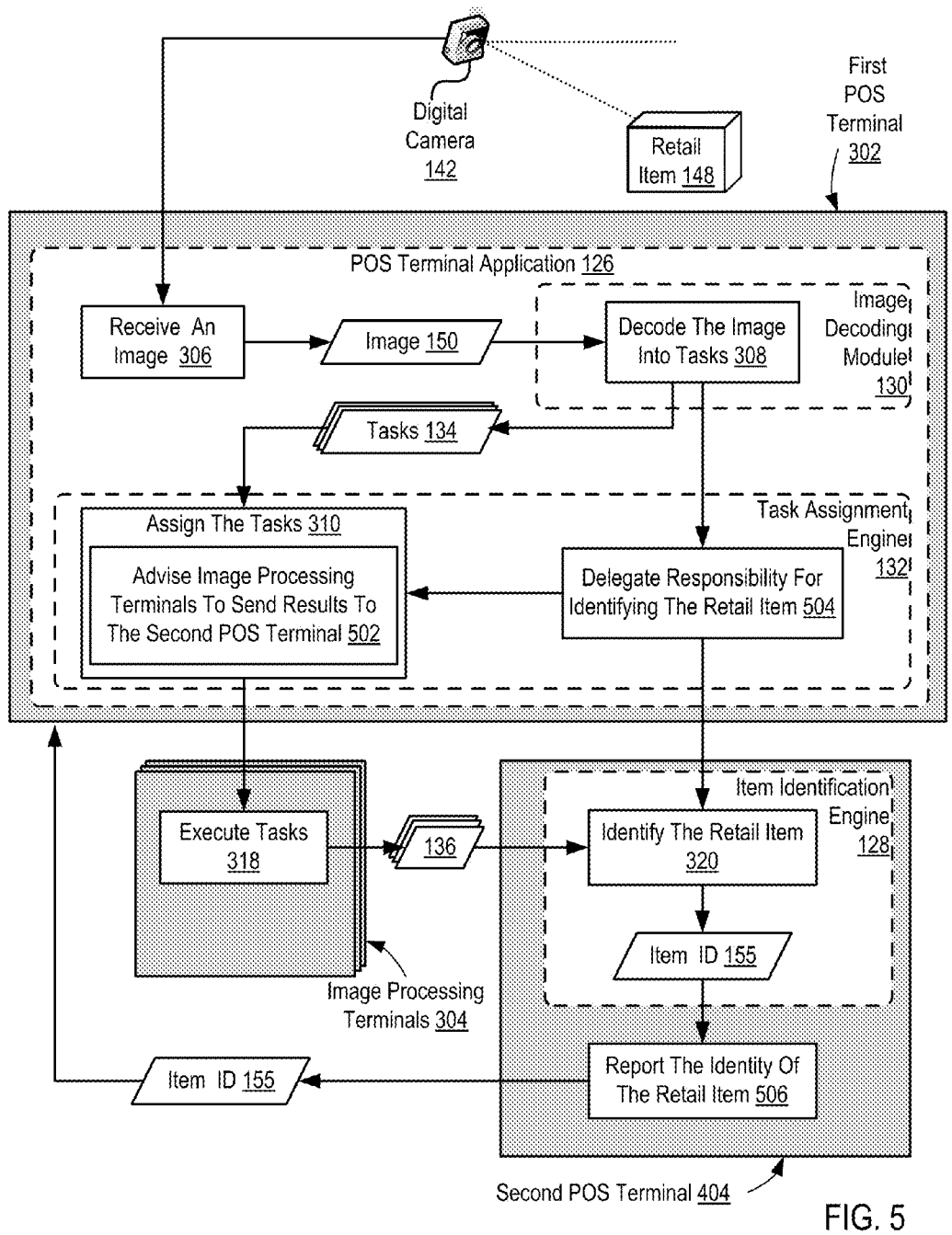
FIG. 5 sets forth a flow chart illustrating a further exemplary method for graphical retail item identification according to embodiments of the present invention.

For further explanation, FIG. 5 sets forth a flow chart illustrating a further exemplary method for graphical retail item identification according to embodiments of the present invention. The method of FIG. 5 is similar to the method of FIG. 3 in that the method of FIG. 5 is also implemented with at least one digital camera (142) and a plurality of point-of-sale ('POS') terminals (302, 304, 404) which are connected for data communications through a data communications network. Each of the POS terminals in the example of FIG. 4 also includes, as software components of a POS terminal application (126), an image decoding module (130), a task assignment engine (132), and an item identification engine (128).

The method of FIG. 5 is also similar to the method of FIG. 3 in that the method of FIG. 5 includes receiving (306), from the digital camera (142), an image (150) of a retail item (148) to be identified; decoding (308), by an image decoding module (130), the image (150) into one or more image processing tasks (134); assigning (310), by a task assignment engine (132), the one or more image processing tasks (134) to one or more of the POS terminals, the one or more POS terminals characterized as image processing terminals (304); executing (318) the image processing tasks (134) by the image processing terminals (304), including reporting results (136) of the image processing tasks (134) to an item identification engine (128); and identifying (320), by the item identification engine (128) upon completion of the image processing tasks (134) by the image processing terminals (304), the retail item (148).

The method of FIG. 5 differs from the method of FIG. 3 in that the method of FIG. 5 includes delegating (504), by a task assignment engine of a first POS terminal (302) to a second POS terminal (404), responsibility for identifying (320) the retail item upon completion of the image processing tasks. That is, unlike the method of FIG. 5, identifying (320) the retail item is carried out by the second POS terminal, not the first POS terminal.

In the method of FIG. 5, assigning (310) the image processing tasks (502) includes advising (502) the image processing terminals (304) to send the results (136) of the image processing tasks to the second POS terminal (404). That is, instead of sending the results of the image processing tasks back to the POS terminal that assigned the processing task, the image processing terminals (304) are advised by the first POS terminal to send the results to the second POS terminal where the retail item is identified.

After the item identification engine (128) of the second POS terminal (404) identifies (320) the retail item, the method of FIG. 4 continues by reporting (506), by the second POS terminal (404) to the first POS terminal (302), the identity (155) of the retail item (148).

Exemplary embodiments of the present invention are described largely in the context of a fully functional computer system for graphical retail item identification. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A graphical method of retail item identification, the method implemented with at least one digital camera and a plurality of point-of-sale ('POS') terminals, the POS terminals connected for data communications through a data communications network, the POS terminals comprising automated computing machinery having disposed within it instances of an image decoding module, a task assignment engine, and an item identification engine, the method comprising:
   receiving, from the digital camera, an image of a retail item to be identified;
   decoding, by an image decoding module, the image into one or more image processing tasks;
   assigning, by a task assignment engine, the one or more image processing tasks to one or more of the POS terminals, the one or more POS terminals characterized as image processing terminals;
   executing the image processing tasks by the image processing terminals, including reporting results of the image processing tasks to an item identification engine; and
   identifying, by the item identification engine upon completion of the image processing tasks by the image processing terminals, the retail item.

2. The method of claim 1 wherein receiving an image further comprises receiving the image by a second POS terminal indirectly from the camera through a first POS terminal, the camera attached directly to the first POS terminal, and the method further comprises:
   delegating, by a task assignment engine of the first POS terminal to the second POS terminal, responsibility for decoding the image, assigning the image processing tasks, and identifying the retail item upon completion of the image processing tasks; and reporting, by the second POS terminal to the first POS terminal, the identity of the retail item.

3. The method of claim 1 wherein:
the method further comprises delegating, by a task assignment engine of a first POS terminal to a second POS terminal, responsibility for identifying the retail item upon completion of the image processing tasks;
assigning the image processing tasks further comprises advising the image processing terminals to send the results of the image processing tasks to the second POS terminal;
identifying the retail item further comprises identifying, by an item identification engine of the second POS terminal upon completion of the image processing tasks by the one or more POS terminals, the retail item; and
the method further comprises reporting, by the second POS terminal to the first POS terminal, the identity of the retail item.

4. The method of claim 1 further comprising providing an item recognition database to the POS terminals, the item recognition database associating graphic image characteristics of retail items and identifiers of retail items, wherein:
the results of the image processing tasks comprise graphic image characteristics of the retail item; and
identifying the retail item further comprises finding a record in the database that includes the graphic image characteristics of the retail item.

5. The method of claim 1 wherein:
assigning, by a task assignment engine, the one or more image processing tasks further comprises querying the image processing terminals for availability of image processing resources; and
if image processing resources of the image processing terminals are available, the method further comprises advising the task assignment engine, by the image processing terminals, of the availability of image processing resources.

6. The method of claim 1 wherein assigning, by a task assignment engine, the one or more image processing tasks further comprises:
sending to each of the image processing terminals the image of the retail item to be identified, a distance from which the image was captured by the digital camera, an angle at which the image was captured by the digital camera, and an instruction to identify at least one graphic image characteristics of the retail item.

7. Apparatus for graphical retail item identification, the apparatus comprising at least one digital camera and a plurality of point-of-sale ('POS') terminals, the POS terminals connected for data communications through a data communications network, the apparatus further comprising a computer processor, a computer memory operatively coupled to the computer processor, the computer memory having disposed within it instances of an image decoding module, a task assignment engine, and an item identification engine, the computer memory also having disposed within it computer program instructions capable of:
receiving, from the digital camera, an image of a retail item to be identified;
decoding, by an image decoding module, the image into one or more image processing tasks;
assigning, by a task assignment engine, the one or more image processing tasks to one or more of the POS terminals, the one or more POS terminals characterized as image processing terminals;
executing the image processing tasks by the image processing terminals, including reporting results of the image processing tasks to an item identification engine; and
identifying, by the item identification engine upon completion of the image processing tasks by the image processing terminals, the retail item.

8. The apparatus of claim 7 wherein receiving an image further comprises receiving the image by a second POS terminal indirectly from the camera through a first POS terminal, the camera attached directly to the first POS terminal, and the apparatus further comprises computer program instructions capable of:
delegating, by a task assignment engine of the first POS terminal to the second POS terminal, responsibility for decoding the image, assigning the image processing tasks, and identifying the retail item upon completion of the image processing tasks; and
reporting, by the second POS terminal to the first POS terminal, the identity of the retail item.

9. The apparatus of claim 7 wherein:
the apparatus further comprises computer program instructions capable of delegating, by a task assignment engine of a first POS terminal to a second POS terminal, responsibility for identifying the retail item upon completion of the image processing tasks;
assigning the image processing tasks further comprises advising the image processing terminals to send the results of the image processing tasks to the second POS terminal;
identifying the retail item further comprises identifying, by an item identification engine of the second POS terminal upon completion of the image processing tasks by the one or more POS terminals, the retail item; and
the apparatus further comprises computer program instructions capable of reporting, by the second POS terminal to the first POS terminal, the identity of the retail item.

10. The apparatus of claim 7 further comprising computer program instructions capable of providing an item recognition database to the POS terminals, the item recognition database associating graphic image characteristics of retail items and identifiers of retail items, wherein:
the results of the image processing tasks comprise graphic image characteristics of the retail item; and
identifying the retail item further comprises finding a record in the database that includes the graphic image characteristics of the retail item.

11. The apparatus of claim 7 wherein:
assigning, by a task assignment engine, the one or more image processing tasks further comprises querying the image processing terminals for availability of image processing resources; and
if image processing resources of the image processing terminals are available, the apparatus further comprises computer program instructions capable of advising the task assignment engine, by the image processing terminals, of the availability of image processing resources.

12. The apparatus of claim 7 wherein assigning, by a task assignment engine, the one or more image processing tasks further comprises:
sending to each of the image processing terminals the image of the retail item to be identified, a distance from which the image was captured by the digital camera, an angle at which the image was captured by the digital camera, and an instruction to identify at least one graphic image characteristics of the retail item.

13. A computer program product for graphical retail item identification, the retail item identification implemented with at least one digital camera and a plurality of point-of-sale ('POS') terminals, the POS terminals connected for data communications through a data communications network, the POS terminals comprising automated computing machinery having disposed within it instances of an image decoding module, a task assignment engine, and an item identification engine, the computer program product disposed in a non-transitory computer readable medium, the computer program product comprising computer program instructions capable of:

receiving, from the digital camera, an image of a retail item to be identified;

decoding, by an image decoding module, the image into one or more image processing tasks;

assigning, by a task assignment engine, the one or more image processing tasks to one or more of the POS terminals, the one or more POS terminals characterized as image processing terminals;

executing the image processing tasks by the image processing terminals, including reporting results of the image processing tasks to an item identification engine; and identifying, by the item identification engine upon completion of the image processing tasks by the image processing terminals, m.

14. The computer program product of claim 13 wherein receiving an image further comprises receiving the image by a second POS terminal indirectly from the camera through a first POS terminal, the camera attached directly to the first POS terminal, and the computer program product further comprises computer program instructions capable of:

delegating, by a task assignment engine of the first POS terminal to the second POS terminal, responsibility for decoding the image, assigning the image processing tasks, and identifying the retail item upon completion of the image processing tasks; and reporting, by the second POS terminal to the first POS terminal, the identity of the retail item.

15. The computer program product of claim 13 wherein:

the computer program product further comprises computer program instructions capable of delegating, by a task assignment engine of a first POS terminal to a second POS terminal, responsibility for identifying the retail item upon completion of the image processing tasks;

assigning the image processing tasks further comprises advising the image processing terminals to send the results of the image processing tasks to the second POS terminal;

identifying the retail item further comprises identifying, by an item identification engine of the second POS terminal upon completion of the image processing tasks by the one or more POS terminals, the retail item; and the computer program product further comprises computer program instructions capable of reporting, by the second POS terminal to the first POS terminal, the identity of the retail item.

16. The computer program product of claim 13 further comprising computer program instructions capable of providing an item recognition database to the POS terminals, the item recognition database associating graphic image characteristics of retail items and identifiers of retail items, wherein:

the results of the image processing tasks comprise graphic image characteristics of the retail item; and identifying the retail item further comprises finding a record in the database that includes the graphic image characteristics of the retail item.

17. The computer program product of claim 13 wherein:

assigning, by a task assignment engine, the one or more image processing tasks further comprises querying the image processing terminals for availability of image processing resources; and if image processing resources of the image processing terminals are available, the computer program product further comprises computer program instructions capable of advising the task assignment engine, by the image processing terminals, of the availability of image processing resources.

18. The computer program product of claim 13 wherein assigning, by a task assignment engine, the one or more image processing tasks further comprises:

sending to each of the image processing terminals the image of the retail item to be identified, a distance from which the image was captured by the digital camera, an angle at which the image was captured by the digital camera, and an instruction to identify at least one graphic image characteristics of the retail item.

\* \* \* \* \*